Patented May 20, 1930

1,759,464

UNITED STATES PATENT OFFICE

PHILIP PHILLIPS, OF ORLANDO, FLORIDA

PROCESS OF PRESERVING CITRUS FRUIT

No Drawing.  Application filed June 10, 1929.  Serial No. 369,925.

This invention relates to improvements in the process of preserving citrus fruit, as grape fruit and oranges, for marketing in containers hereinafter referred to by the generic term, cans.

The present common practice is to remove the peel or skin of the fruit, usually facilitating such removal by the use of lye and water, then to separate each segment of pulp from the core and separating membranes (said membranes being the thin skins which divide the pulp into segments) as completely as possible, and then submit the pulp of the segments to the usual cooking operations and sealing up in cans or jars. Owing to the removal of the membranes, there is nothing to ensure retention of the pulp in a condition other than mushy which is not attractive to consumers. Other objections are that the natural flavor of the fruit is somewhat impaired, and the operations can not be performed in a satisfactory sanitary manner and the manual labor required to remove the membranes from the segments of pulp is expensive.

The object of the present invention is to so improve the process of canning citrus fruit that the cost of production is reduced, and the canned product is more sanitary, and the natural flavor of the fruit is better preserved than heretofore.

The above objects are attained chiefly by (after removal of the peel or skin of the fruit and after coring the fruit to remove the pips or seeds) cutting the substantially solid peeled fruit transversely across so as to include, with the pulp, sections or pieces of the membranes which, in the fresh fruit, separates the segments. Then the pieces or slices of pulp, including pieces of the membranes, are cooked and canned in the customary way.

There are several advantages resulting from the cutting of the substantially solid fruit, after removing the outer peel or skin, into pieces or slices including the membranes of the segments. The cutting may be in a plane more or less tangent to the core of the fruit so long as the membranes as well as the pulp are cut on lines to produce substantially vertical sections of pulp having intermediate pieces of membrane. One of said advantages is reduction of the cost of production because the cutting can be readily effected by mechanical means instead of requiring manual labor to first separate the segments from the core and membranes; another is that mechanical treatment of edible material is more sanitary than manual treatment; another is that pieces of membrane serve to join pieces of pulp together and result in greatly reducing the tendency of the pulp to become mushy when cooked and canned; another is that the taste of the canned fruit is better than heretofore because the natural orange or grapefruit oil which is in the membranes is retained in the canned edible substance; and another is that any piece of fruit which is substantially whole seems to taste better than if in a mushy condition.

Having now described my invention, I claim:

That improvement in the process of producing canned citrus fruit, consisting in removing the peel or skin and the core of the fruit and cutting the pulp in a plurality of locations to produce vertical sections of pulp having intermediate pieces of membrane.

In testimony whereof I have affixed my signature.

PHILIP PHILLIPS.